United States Patent
Ramagopal et al.

(10) Patent No.: US 6,606,684 B1
(45) Date of Patent: Aug. 12, 2003

(54) MULTI-TIERED MEMORY BANK HAVING DIFFERENT DATA BUFFER SIZES WITH A PROGRAMMABLE BANK SELECT

(75) Inventors: Hebbalalu S. Ramagopal, Austin, TX (US); Michael Allen, Austin, TX (US); Jose Fridman, Brookline, MA (US); Marc Hoffman, Mansfield, MA (US)

(73) Assignees: Intel Corporation, Santa Clara, CA (US); Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/541,114

(22) Filed: Mar. 31, 2000

(51) Int. Cl.$^7$ ............................................... G06F 12/10
(52) U.S. Cl. ........................ 711/118; 711/120; 711/170; 711/209
(58) Field of Search ................................ 711/118, 120, 711/170, 209

(56) References Cited

U.S. PATENT DOCUMENTS

| | | | | |
|---|---|---|---|---|
| 4,623,990 A | | 11/1986 | Allen et al. ................. 365/189 |
| 5,001,671 A | * | 3/1991 | Koo et al. ............. 365/230.05 |
| 5,175,841 A | | 12/1992 | Magar et al. ................. 395/425 |
| 5,257,359 A | | 10/1993 | Blasco et al. ................. 395/425 |
| 5,410,669 A | | 4/1995 | Biggs et al. ................. 395/425 |
| 5,465,344 A | * | 11/1995 | Hirai et al. .................. 711/131 |
| 5,535,359 A | | 7/1996 | Hata et al. ................... 395/446 |
| 5,537,576 A | | 7/1996 | Perets et al. ................. 395/447 |
| 5,559,986 A | * | 9/1996 | Alpert et al. ................ 711/127 |
| 5,611,075 A | | 3/1997 | Garde ......................... 395/480 |
| 5,737,564 A | | 4/1998 | Shah .......................... 395/412 |
| 6,023,466 A | * | 2/2000 | Luijten et al. .......... 370/395.31 |
| 6,038,630 A | * | 3/2000 | Foster et al. ................. 710/317 |
| 6,038,647 A | | 3/2000 | Shimizu ...................... 711/168 |
| 6,127,843 A | | 10/2000 | Agrawal et al. ............... 326/40 |
| 6,189,073 B1 | * | 2/2001 | Pawlowski ................... 711/119 |
| 6,256,720 B1 | | 7/2001 | Nguyen et al. ............... 712/23 |
| 6,321,318 B1 | * | 11/2001 | Baltz et al. .................. 711/154 |
| 6,334,175 B1 | | 12/2001 | Chih .......................... 711/170 |
| 6,446,181 B1 | * | 9/2002 | Ramagopal et al. ......... 711/131 |

FOREIGN PATENT DOCUMENTS

| | | | | |
|---|---|---|---|---|
| DE | 19809640 A1 | * | 9/1999 | ........... G06F/15/80 |
| EP | WO-99/45474 | * | 10/1999 | ........... G06F/15/00 |
| WO | WO98/13763 | | 4/1998 | ........... G06F/12/08 |

OTHER PUBLICATIONS

Texas Instruments Application Report SPRA472, "TMS320C6211 Cache Analysis," pp 1–11, Sep. 1998.*
International Search Report for International Application PCT/US01/10573 dated Nov. 22, 2001.*
Su et al., "A Study of Cache Hashing Functions for Symbolic Applications in Micro–parallel Processors," pp 530–535, IEEE, 1994.*
Zhang et al., "Multi–Column Implementations for Cache Associativity," pp 504–509, IEEE, 1997.*

* cited by examiner

*Primary Examiner*—Matthew Kim
*Assistant Examiner*—Stephen Elmore
(74) *Attorney, Agent, or Firm*—Fish & Richardson P.C.

(57) ABSTRACT

An apparatus having a core processor and a plurality of cache memory banks is disclosed. The cache memory banks are connected to the core processor in such a way as to provide substantially simultaneous data accesses for said core processor.

9 Claims, 6 Drawing Sheets

MULTI-TIERED MEMORY BANK HAVING DIFFERENT DATA BUFFER SIZES WITH A PROGRAMMABLE BANK SELECT

BACKGROUND

This disclosure generally relates to digital signal processing and other processing applications, and specifically to a programmable bank selection of banked cache architecture in such an application.

A digital signal processor (DSP) is a special purpose computer that is designed to optimize performance for digital signal processing and other applications. The applications include digital filters, image processing and speech recognition. The digital signal processing applications are often characterized by real-time operation, high interrupt rates and intensive numeric computations. In addition, the applications tend to be intensive in memory access operations, which may require the input and output of large quantities of data. Therefore, characteristics of digital signal processors may be quite different from those of general-purpose computers.

One approach that has been used in the architecture of digital signal processors to achieve high-speed numeric computation is the Harvard architecture. This architecture utilizes separate, independent program and data memories so that the two memories may be accessed simultaneously. The digital signal processor architecture permits an instruction and an operand to be fetched from memory in a single clock cycle. A modified Harvard architecture utilizes the program memory for storing both instructions and operands to achieve full memory utilization. Thus, the program and data memories are often interconnected with the core processor by separate program and data buses.

When both instructions and operands (data) are stored in the program memory, conflicts may arise in the fetching of instructions. Certain instruction types may require data fetches from the program memory. In the pipelined architecture that may be used in a digital signal processor, the data fetch required by an instruction of this type may conflict with a subsequent instruction fetch. Such conflicts have been overcome in prior art digital signal processors by providing an instruction cache. Instructions that conflict with data fetches are stored in the instruction cache and are fetched from the instruction cache on subsequent occurrences of the instruction during program execution.

Although the modified Harvard architecture used in conjunction with an instruction cache provides excellent performance, the need exists for further enhancements to the performance of digital signal processors. In particular, increased computation rates and enhanced computation performance of the memory system can provide advantages.

BRIEF DESCRIPTION OF THE DRAWINGS

Different aspects of the disclosure will be described in reference to the accompanying drawings wherein.

DETAILED DESCRIPTION

A processor's memory system architecture can have a significant impact on the processor performance. For example, fast execution of multiply-and-accumulate operations requires fetching an instruction word and two data words from memory in a single instruction cycle. Current digital signal processors (DSP) use a variety of techniques to achieve this, including multi-ported memories, separate instruction and data memories, and instruction caches. To support multiple simultaneous memory accesses, digital signal processors use multiple on-chip buses and multi-ported memories.

Enhanced performance of the memory system can be accomplished using single-ported memory array having "multi-ported" behavior. Parallel accesses to multiple banks can be performed by providing configurable, fast static random access memory (SRAM) on chip. Alternatively, the memory system can be configured with caches, which provide a simple programming model.

Figure 1:
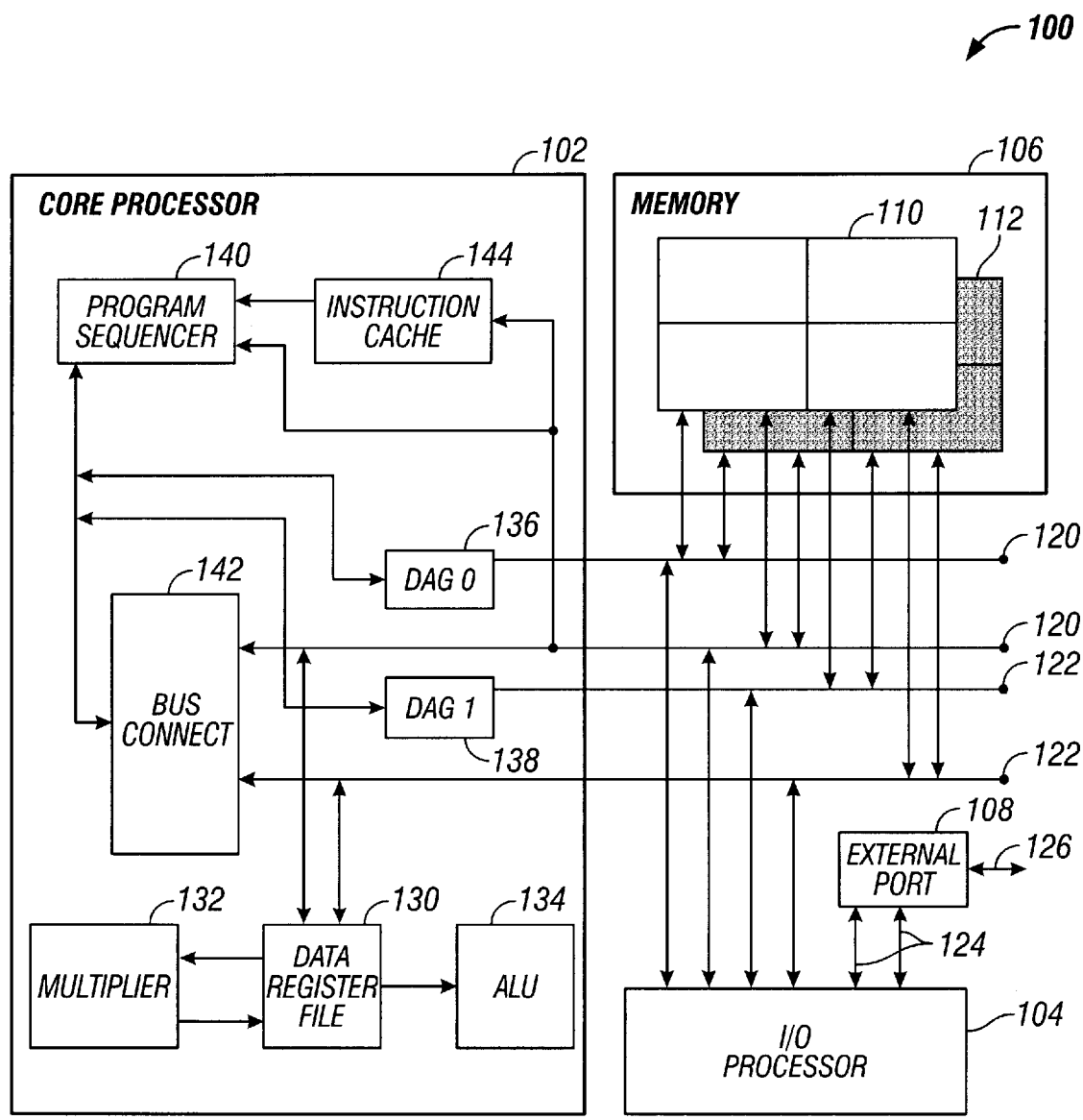
FIG. 1 is a block diagram of a digital signal processor (DSP) in accordance with one embodiment of the present invention.

A block diagram of a digital signal processor (DSP) 100 in accordance with one embodiment of the present disclosure is shown in FIG. 1. The DSP is configured in a modified Harvard architecture. Principal components of the DSP 100 are a core processor 102, an I/O processor 104, a memory system 106 and an external port 108. The core processor 102 performs the main computation and data processing functions of the DSP 100. The I/O processor 104 controls external communications via external port 108, one or more serial ports and one or more link ports.

The DSP 100 is configured as a single monolithic integrated circuit. In one embodiment, the memory system 106 implementation supports the SRAM-based model with two super-banks of 16 kilobits each for a total of 32 kilobits. These two super-banks of memory are accessed simultaneously in each cycle to support the core processor requirements. Alternatively, each of these super-banks can be configured as cache memory.

A first memory bus 120 interconnects the core processor 102, I/O processor 104, and memory system 106. A second memory bus 122 likewise interconnects core processor 102, I/O processor 104, and memory system 106. In some embodiments, the first memory bus 120 and the second memory bus 122 are configured as a data memory bus and a program memory bus, respectively. An external port (EP) bus 124 interconnects I/O processor 104 and external port 108. The external port 108 connects the EP bus 124 to an external bus 126. Each of the buses 120, 122 includes a data bus and an address bus. Each of the buses includes multiple lines for parallel transfer of binary information.

The core processor 102 includes a data register file 130 connected to the first memory bus 120 and the second memory bus 122. The data register file 130 is connected in parallel to a multiplier 132 and an arithmetic logic unit (ALU) 134. The multiplier 132 and the ALU 134 perform single cycle instructions. The parallel configuration maximizes computational throughput. Single, multi-function instructions execute parallel ALU and multiplier operations.

The core processor 12 further includes a first data address generator (DAG0) 136, a second data address generator (DAG1) 138 and a program sequencer 140. A bus connect multiplexer 142 receives inputs from the first memory bus 120 and the second memory bus 122. The multiplexer 142 supplies bus data to data address generators 136, 138 and to the program sequencer 140. The first data address generator 136 supplies addresses to the first memory bus 120. The second data address generator 138 supplies addresses to the second memory bus 122.

The core processor 102 further includes an instruction cache 144 connected to the program sequencer 140. The instruction cache 102 fetches an instruction and two data values. The instruction cache 102 is selective in that only the instructions whose instruction fetches conflict with data accesses are cached.

For some embodiments, the DSP 100 utilizes an enhanced Harvard architecture in which the first memory bus 120 transfers data, and the second memory bus 122 transfers both instructions and data. With separate program and data memory buses and the on-chip instruction cache 144, the core processor 102 can simultaneously fetch two operands (from memory banks 110, 112) and an instruction (from cache 144), all in a single cycle.

Figure 2:
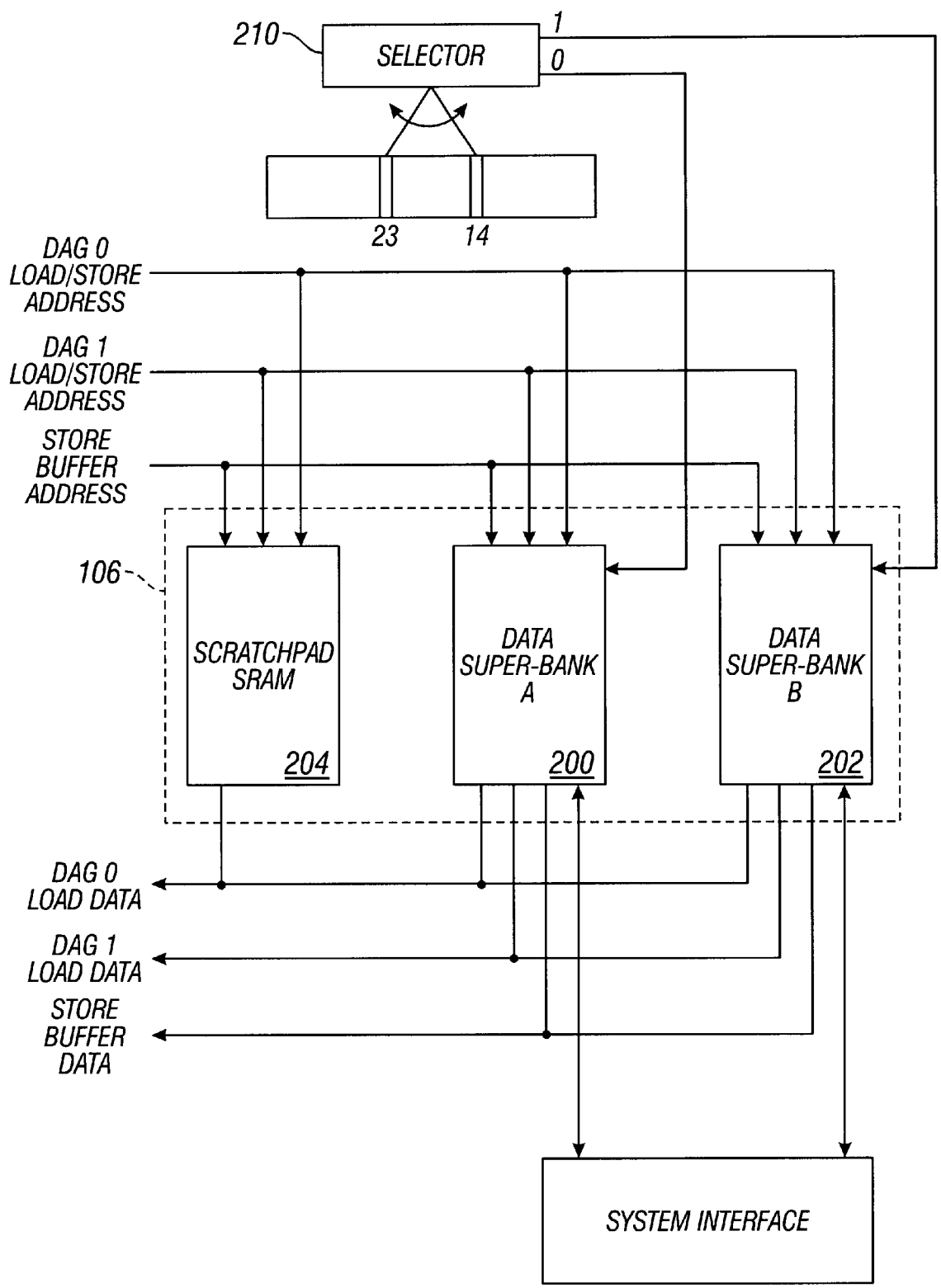
FIG. 2 is a block diagram of a memory system containing two super-banks according to one embodiment of the present invention.

The memory system 106, illustrated in detail in FIG. 2, preferably contains two super-banks of 16 kilobits each for a total of 32 kilobits. The super-banks A 200 and B 202 are accessed simultaneously in each cycle to support the core processor 102 requirements.

Each of these super-banks 200, 202 can be configured as a SRAM and/or cache. By supporting both an SRAM and cache implementations together, the memory architecture provides flexibility for system designers. Configuring the memory as all cache helps the system designer by providing an easy programming model of the data cache for the rest of the code (e.g. operating system, micro-controller code, etc.). Configuring it as all SRAM provides predictability and performance for key digital signal processing applications. The hybrid version, e.g. half SRAM and half cache, allows mapping of critical data sets into the SRAM for predictability and performance, and mapping of the rest of the code into the cache to take advantage of the easy programming model with caches. Further, by providing SRAM behavior at the memory, significant performance advantage can be achieved with low access latencies. In addition to the two super-banks, a 4-kilobit scratchpad SRAM 204 is provided as a user stack to speed up data switches.

Figure 3:
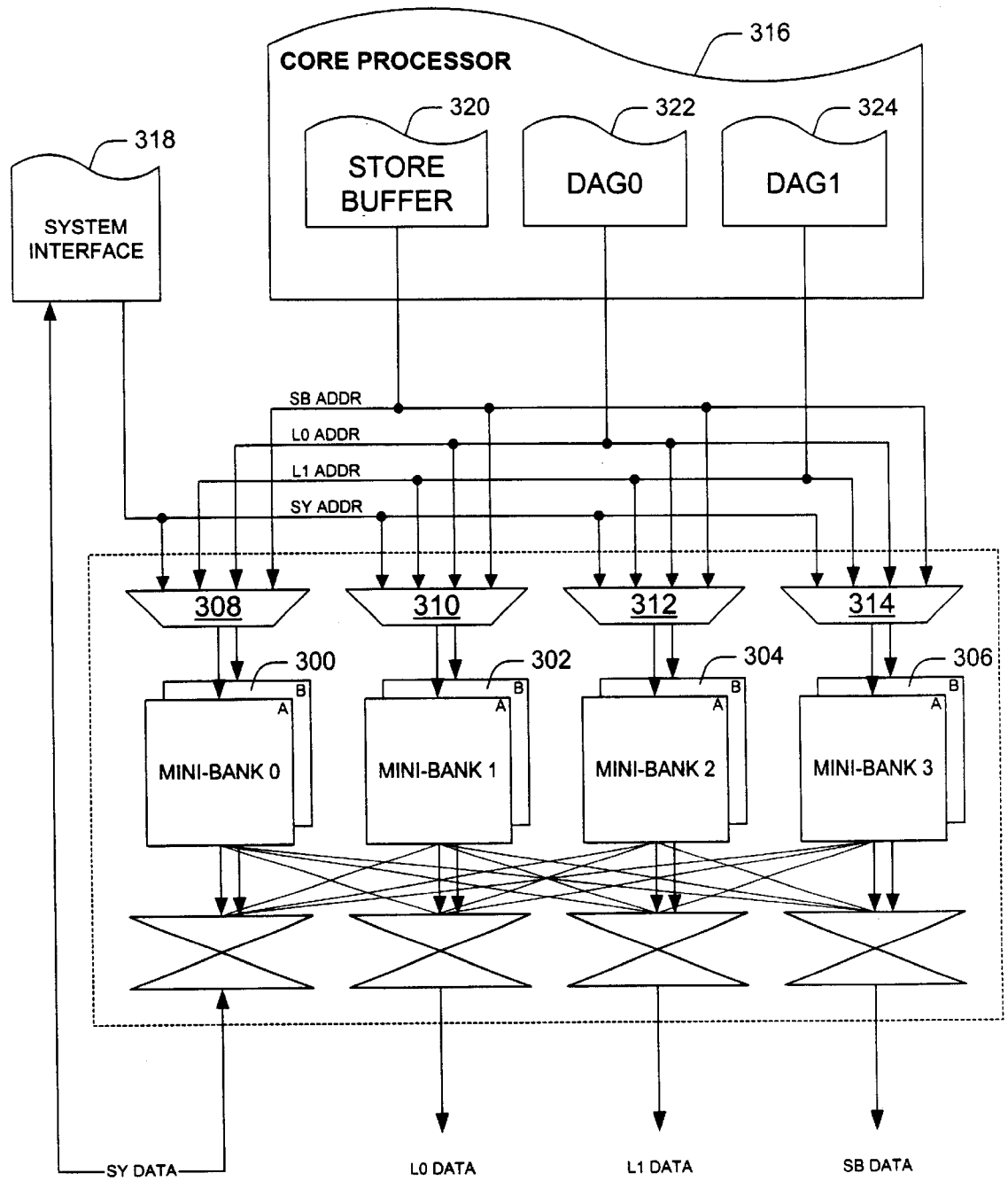
FIG. 3 is another embodiment of the memory system showing the mini-banks.

In one embodiment, each of the data super-banks 200, 202 is 16 kilobits in size and is further divided into four 4-kilobit mini-banks 300, 302, 304, 306. FIG. 3 shows a more detailed block diagram of the memory system 106. In the illustrated embodiment, each mini-bank 300, 302, 304, 306 is a two-way set associative cache and is configured as a single-ported memory array. By providing parallel accesses to eight different mini-banks 300, 302, 304, 306 in the two super-banks A and B, a "multi-ported" memory behavior can be achieved. Multiplexers 308, 310, 312, 314 selectively provide accesses of the mini-banks 300, 302, 304, 306, respectively. The selective accesses are provided to the core processor 316 and the system interface 318, such as an I/O processor. However, since the configuration is not a true multi-port system, simultaneous accesses to a same mini-bank are not allowed. Thus, if two accesses are addressed to the same mini-bank, a conflict results. One of the accesses is delayed by one clock cycle.

For one particular embodiment, the first data address generator 322, the second data address generator 324, and the store buffer 320 provide addresses for two operands and a result, respectively.

The core processor 316 controls the configuration of the super-banks A and B of the memory system 106. The configuration can be defined as described below in Table 1.

TABLE 1

| Memory Configuration | Super-bank A | Super-bank B |
| --- | --- | --- |
| 0 | SRAM | SRAM |
| 1 | Reserved | Reserved |
| 2 | Cache | SRAM |
| 3 | Cache | Cache |

The memory configurations 0 and 3 divide each super-bank into four mini-banks of all SRAM and all cache design, respectively. Each configuration provides either flexibility or ease of programming for the rest of the code. The memory configuration 2 supports hybrid design that allows mapping of critical data sets into the SRAM for predictability and performance, and mapping of the rest of the code into the cache to take advantage of the easy programming model with caches. When the SRAM mode is enabled, the logical address and physical address are the same. The memory configuration 1 is reserved for a future configuration.

Figure 4:
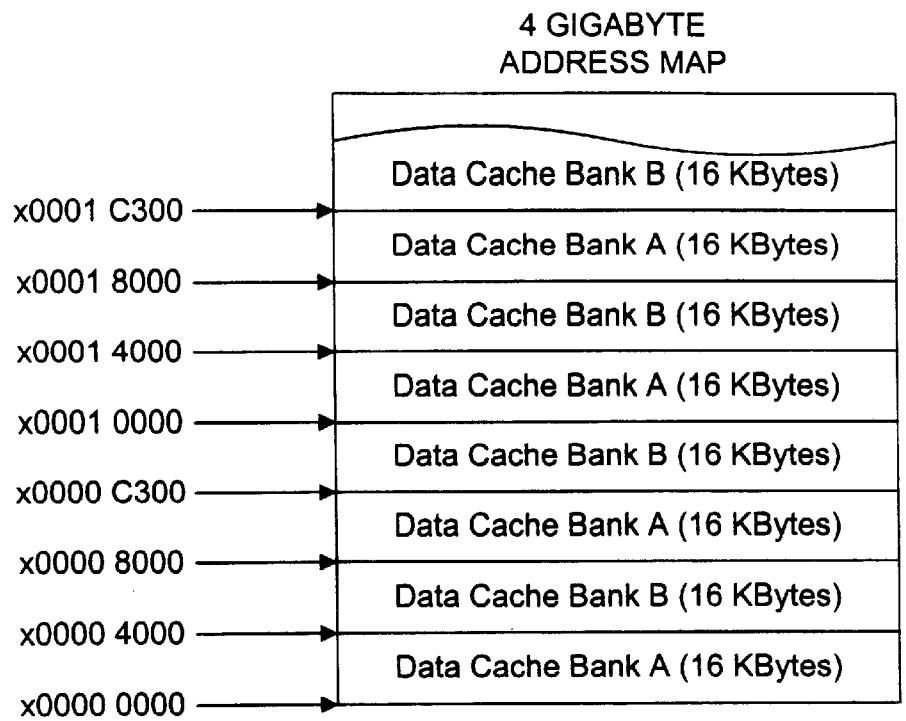
FIG. 4 shows a cache address map divided into contiguous memory regions of 16 kilobytes each according to one embodiment.
Figure 5:
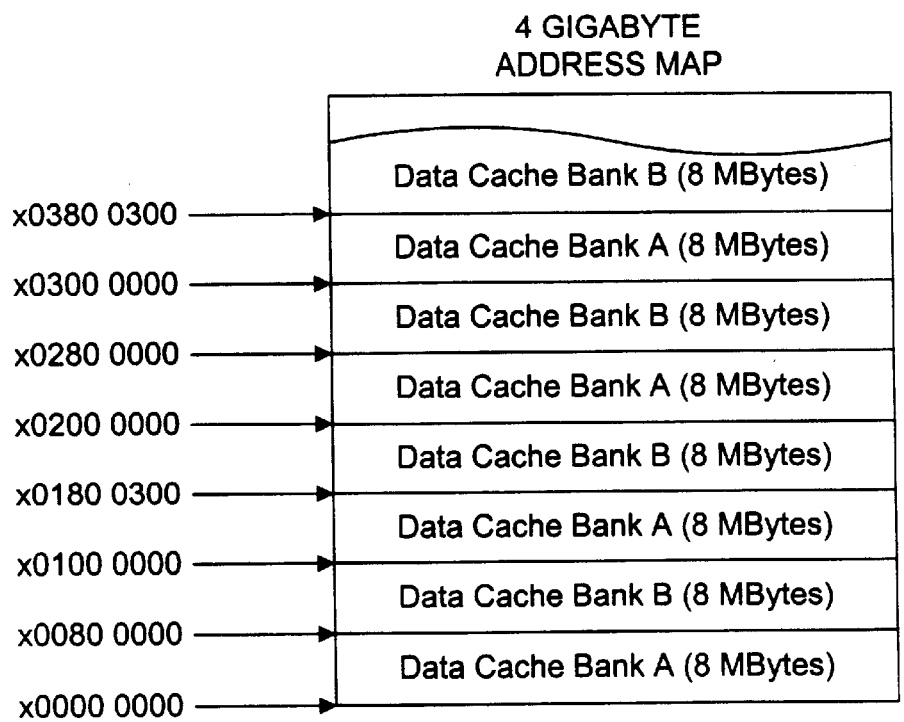
FIG. 5 shows a cache address map divided into contiguous memory regions of 8 megabytes each according to one embodiment.

FIGS. 4 and 5 show examples of cache memory organization. For the illustrated embodiments of the physical memory address map, bank selection is performed to allow parallel cache accesses of different buffer sizes. For example, contiguous memory regions of 16 kilobytes each. The memory regions can be alternately mapped to one of two cache super-banks A and B. In another example of FIG. 5, a cache address map is divided into contiguous memory regions of 8 megabytes each. For some embodiments, the cache address map is programmable to any practicable bank size. In addition, the bank size can be programmed dynamically so that the size can be modified in real-time according to specific implementations. The programmable selection has no effect unless both of the two cache super-banks A and B are configured as cache.

Figure 7:
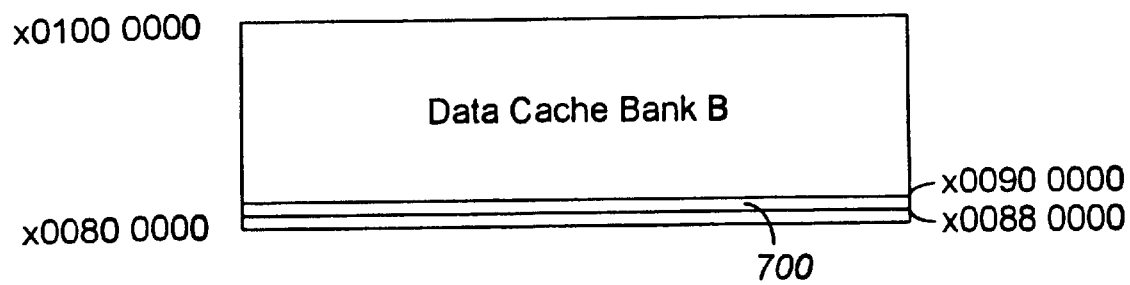
FIG. 7 shows an 8 MByte memory region from the address map of FIG. 5 including a 500 KByte buffer.

The organization of cache memory allowing programmable bank size offer certain advantages over fixed bank size. Programming the memory into relatively small bank size offers advantage of increasing the chances that un-optimized code accesses both banks of cache. Large bank size favors applications with large data buffers, where a programmer needs to map large buffers into one bank for optimal performance. For example, FIG. 7 shows a 500 KByte buffer in an 8 MByte region of the address map of FIG. 5, which would not fit in a 16 KByte region of the address map shown in FIG. 4.

Figure 6:
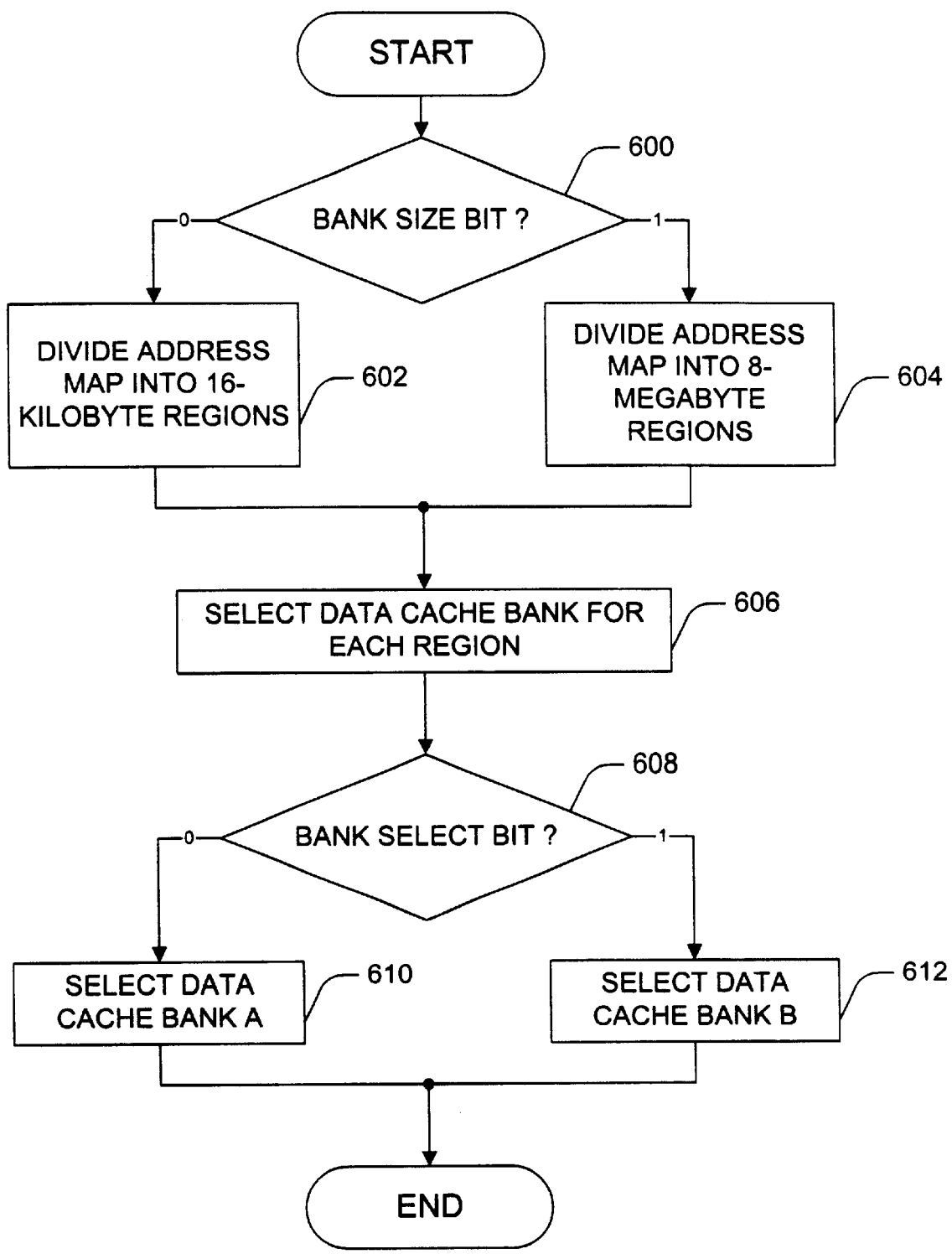
FIG. 6 is a programmable bank selection process in accordance with one embodiment of the present invention.

FIG. 6 shows a programmable bank selection process in accordance with one embodiment of the present invention. At 600, a bank size selection bit is queried by a selector 210 (FIG. 2) to determine the cache memory bank size. If the bank size selection bit is zero, the address map is divided into contiguous memory regions of 16 kilobytes each at 602. Otherwise, if the bank size selection bit is one, the address map is divided into memory regions of 8 megabytes each at 604. At 606, it is determined which data cache bank (i.e. A or B) is mapped to each region. This determination is made by using a bank select bit or by monitoring certain bits in the physical memory address. If the bank select bit is used at 608, data cache bank A is selected at 610 if the bit is zero. Otherwise, data cache bank B is selected at 612 if the bit is one.

A truly multi-ported memory array can provide the bandwidth of two core processor accesses and a direct memory access (DMA) through such an interface as the system interface. However, the area penalty may be large because multi-porting of a memory array can more than double the physical area of the array. Furthermore, the cost of building a multi-ported array often increases exponentially. The memory architecture with multiple memory banks, as described above, can support parallel accesses with minimal hardware overhead. The arrays are single-ported, yet they can provide certain advantages of multi-port behavior, as long as the accesses are to different mini-banks.

The system environment can be optimized for maximum performance with minimal hardware. If DMA accesses are allowed into the cache, complex cache coherency issues are introduced that may result in control complexity and additional hardware. Thus, DMA accesses can be restricted only into the SRAM space. DMA accesses to the 4-kilobit scratchpad SRAM can also be restricted for simplicity.

Besides area advantage, multi-banking memory provides high access bandwidth, which is advantageous for digital signal processor performance. When in cache mode, a super-bank can support two core processor accesses in parallel with a fill or copyback transfer. When in SPAM mode, a super-bank can support dual core processor accesses in parallel with a DMA transfer. Further, power consumption can be reduced to a minimum by powering only the mini-banks that are needed by the accesses in a given cycle. At most, 3 out of 8 mini-banks are used per cycle.

Above described embodiments are for illustrative purposes only. Other embodiments and variations are possible. For example, even though the memory system has been described and illustrated in terms of having two different bank sizes and locations, the memory system can support having many different bank sizes and locations.

All these embodiments are intended to be encompassed by the following claims.

What is claimed is:

1. A system comprising:
    a core processor;
    a cache memory coupled to said core processor, said cache memory having a first block and a second block, where said first block and said second block are connected to said core processor in such a way as to allow substantially simultaneous data accesses for said core processor;
    an address map including
       a first region mapped to the first block, and
       a second region mapped to the second block; and a selector operative to
    cache data having an address in said first region of the address map in the first block, and
    cache data having an address in said second region of the address map in the second block,
    wherein said first region and said second region are contiguous regions in the address map.

2. The system of claim 1, wherein said core processor is a digital signal processor core.

3. The system of claim 1, wherein said first region of the address map and said second region of the address map have a selectable size which is large enough to allow mapping of buffers into a single region of said address map.

4. The system of claim 1, wherein said simultaneous data accesses comprise accesses to both the first block and the second block in the same clock cycle.

5. The system of claim 1, wherein the selector is operative to monitor a particular bit of said data address and determine whether to route the data to the first block or the second block based on a state of said bit.

6. The system of claim 5, wherein the location of the particular bit in the data address corresponds to a size of said first and second regions of the address map.

7. The system of claim 1, further comprising:
    a third region in the address map, said third region being mapped to the first block,
    wherein the second region and the third regions are contiguous regions in the address map.

8. A method comprising:
    selecting a size of regions in an address map;
    dividing the address map into a plurality of regions of said size;
    mapping adjacent regions in the address map to a different one of two banks in a cache memory, said adjacent regions comprising a first region and a second region contiguous with the first region in the address map;
    caching data having an address in said first region of the address map in one of said two banks; and
    caching data having an address in said second region of the address map in the other of said two banks.

9. An article comprising machine-readable medium including machine-executable instructions operative to cause a machine to:
    select a size of regions in an address map;
    divide the address map into a plurality of regions of said size;
    map adjacent regions in the address map to a different one of two banks in a cache memory, said adjacent regions comprising a first region and a second region contiguous with the first region in the address map;
    cache data having an address in said first region of the address map in one of said two banks; and
    cache data having an address in said second region of the address map in the other of said two banks.

* * * * *